United States Patent [19]
Lee et al.

[11] Patent Number: 5,294,933
[45] Date of Patent: Mar. 15, 1994

[54] WIDEBAND RADAR SYSTEM UTILIZING ADAPTIVE INTERFERENCE CANCELER

[75] Inventors: Henry E. Lee, Ellicott City; James H. Mims, Millersville, both of Md.

[73] Assignee: Westinghouse Electric Corp., Pittsburgh, Pa.

[21] Appl. No.: 10,938

[22] Filed: Jan. 29, 1993

[51] Int. Cl.$^5$ ............................................. G01S 13/536
[52] U.S. Cl. ..................................... 342/159; 342/91; 342/201
[58] Field of Search .................. 342/89, 91, 159, 201, 342/203

[56] References Cited

U.S. PATENT DOCUMENTS 5,173,703 12/1992 Mangiapane et al. .......... 342/159 X

OTHER PUBLICATIONS

R. T. Compton Jr., "Chapter 6: Steering Vector Arrays," *Adaptive Antennas: Concepts and Performance*, 335-95 (1988).

Primary Examiner—T. H. Tubbesing

[57] ABSTRACT

A wideband radar apparatus is provided having improved interference suppression characteristics. The known time versus bandwidth characteristic of the transmitted pulse is utilized to effect intermediate frequency bandwidth reduction in received swath echo signals. During the interpulse period, basebanded swath echo signals are then subjected to a series of adaptive interference suppressing updates. The adaptive weight vector produced during each of these updates is then applied to the same data used to generate the weights. Preferably, adaptive weight generation is performed in a systolic array according to a QR decomposition algorithm.

15 Claims, 5 Drawing Sheets

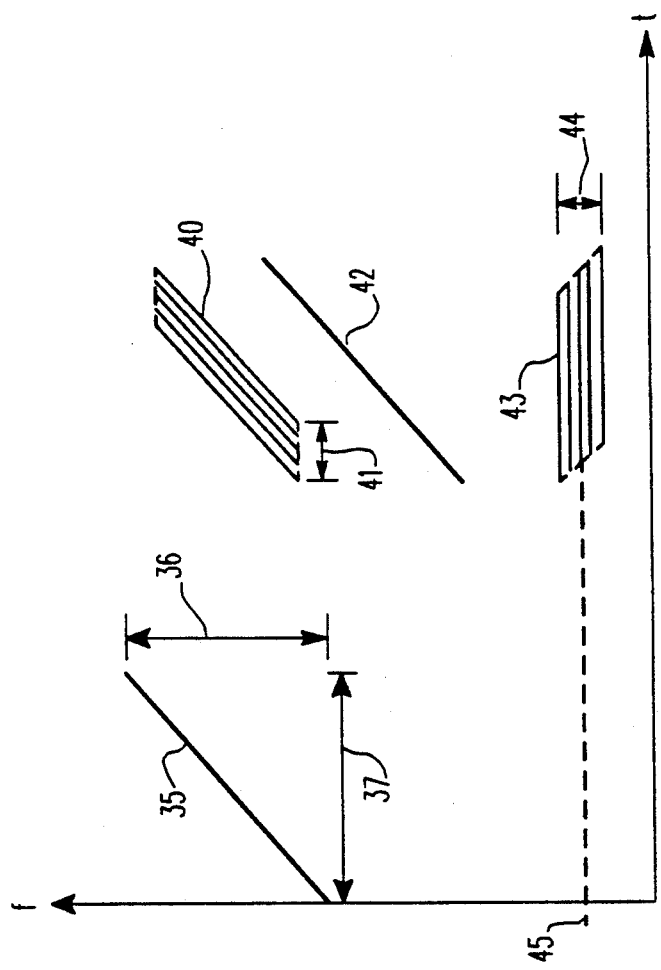

WIDEBAND RADAR SYSTEM UTILIZING ADAPTIVE INTERFERENCE CANCELER

BACKGROUND OF THE INVENTION

1. Field of the Invention

The invention relates to the art of suppressing interference present in a swath echo signal received by a wideband radar apparatus. More particularly, the invention relates to a device and method for facilitating this interference suppression utilizing a series of narrowband solutions.

2. Description of the Prior Art

Modern radar systems having ultrahigh resolution capability are useful in many applications such as target detection and terrain imaging. Such radars require the transmission and reception of radio frequency (RF) signals having a wide bandwidth commensurate with the desired resolution. This bandwidth requirement becomes extremely large at ultrahigh resolution. For example, a 500 megahertz (MHz) bandwidth is needed to support a resolution of one foot.

One radar typically used for these purposes is a synthetic aperture radar (SAR). A SAR utilizes a relatively small antenna aperture translated to have relative movement with respect to the target. At each of a series of sequential positions, a wide bandwidth signal is transmitted. Swath echo signals received in response to each transmission are placed in electronic storage, where it is important that both amplitude and phase information be maintained. After a sufficient number of signals have been stored, the signals are integrated (e.g. added) to produce ultrahigh resolution imagery.

Since the integration in SAR and similar radar systems depends on phase coherence of the integrated signals, it is referred at to coherent integration. Typically, ultrahigh resolution SAR requires a long coherent integration time of tens of seconds during which the radar frequency cannot be changed. Because of the long coherent integration time, as well as the wide bandwidth of the transmitted signals, conventional frequency agility and diversity techniques for interference suppression are of limited utility in these systems.

Steering vector adaptive arrays, often called Applebaum arrays, have been utilized to construct radar systems less susceptible to interference. Such arrays generally utilize a feedback loop which adaptively forms antenna pattern nulls in the direction of interference sources. Although such adaptive cancelers are known, much of the effort to date has been directed toward narrowband applications. The narrowband techniques are not directly applicable to wideband radar because increased frequency dispersion causes expansion of the number of adaptive channels as well as problematic exponential increases in computational requirements.

SUMMARY OF THE INVENTION

A wideband radar apparatus practicing the present invention offers improved interference suppression capability over that provided by the prior art without expansion of the number of adaptive channels or exponential increases in computations. The radar apparatus includes an array of antenna elements combined to form a plurality of primary and secondary channels. Transmitter means are provided for transmitting a long pulse radio frequency signal having a wide bandwidth. The long pulse radio frequency signal is preferably a linear frequency modulated ("chirp") signal, although the invention is adaptable for use when a step chirp waveform signal is transmitted having a number of discrete pulses with different respective fundamental frequencies. A swath echo signal caused by returning electromagnetic energy from the transmitted signal is produced in each of the primary and secondary channels. Receiver means respectively remove the wideband linear FM component in the swath echo signal resulting in constant intermediate frequency signals having a total bandwidth much less than the bandwidth of the transmitted signal. Suppression of interference is facilitated by interference cancellation means which performs a multiplicity of adaptive updates on the swath echo data. This data is then processed by appropriate processing means which perform the desired imaging or tracking functions.

To perform one of these adaptive updates, data from each of the channels is collected in a data buffer so that the adaptive weights eventually produced can be applied to the same data used to generate the weights. After a sufficient number of data samples haves been collected, means are provided for selecting a main channel from the primary channels. All primary channels other than the main channel as well as all of the secondary channels then become auxiliary channels. Data windows from the respective main and auxiliary channels are processed by adaptive vector means which responsively produce a weight vector to minimize interference for the particular update. Respective weights of this weight vector are then applied by appropriate means to corresponding auxiliary channel data windows from the data buffer. The weighted auxiliary channel data windows are then subtracted from the corresponding main channel data window to produce the interference cancelled data which may be passed for further processing.

BRIEF DESCRIPTION OF THE DRAWINGS

FIG. 2 is a graphical representation of the time versus frequency characteristic of various waveforms utilized by the present invention.

DETAILED DESCRIPTION OF PRESENTLY PREFERRED EMBODIMENTS

In accordance with the invention, a wideband radar apparatus may be constructed having improved interference suppression capability. The invention exploits the known time versus frequency relationship of the transmitted pulse signal to transform the wideband interference cancellation problem into a sequence of narrowband cancellation problems. Specifically, the received swath echo signals are converted to intermediate frequency signals having a total bandwidth less than the bandwidth of the transmitted pulse signal. Multiple updates of the adaptive weight vector are performed within each radar interpulse period and are applied to respective subintervals of the reduced bandwidth signals. This significantly reduces the interference bandwidth that each of the adaptive weight vectors is required to handle. As a result, the invention achieves improvements in cancellation ratio with significantly less hardware and computation requirements than prior art techniques.

Figure 1:
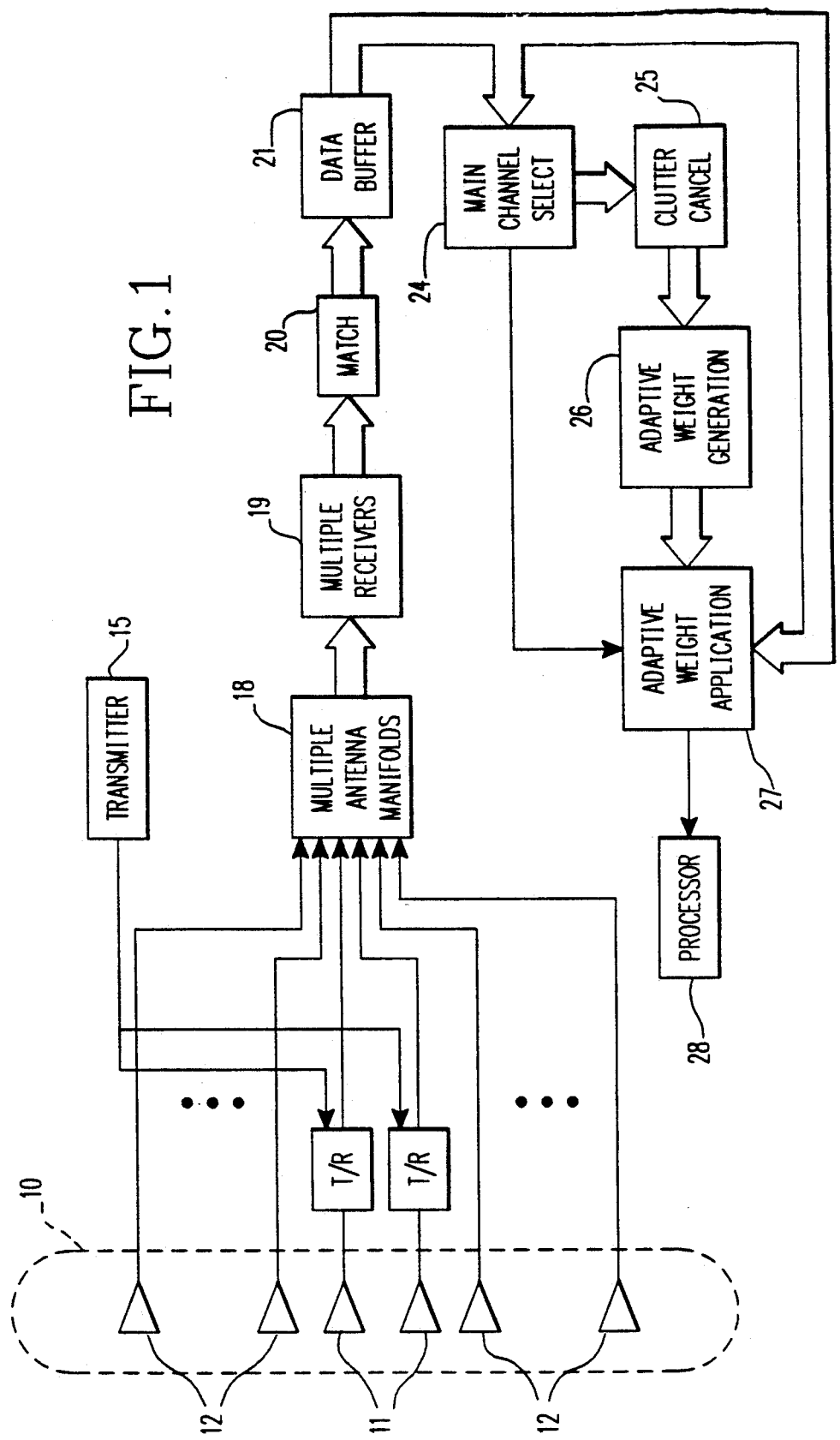
FIG. 1 is a diagrammatic representation of a wideband radar apparatus constructed in accordance with the invention.

FIG. 1 illustrates a presently preferred embodiment of a wideband radar apparatus constructed in accordance with the invention. The radar apparatus utilizes a two dimensional antenna array 10 having a number of primary antenna elements 11 and a plurality of secondary antenna elements 12. Multiple primary antenna elements are needed to effect suppression of interference appearing in the main beam region of the antenna reception pattern. The secondary elements are utilized for suppression of interference in the sidelobe regions.

The primary antenna elements function to broadcast the radar pulse signal developed within transmitter 15. Transmit/receive duplexers ("T/R"), such as duplexer 16, alternately place the respective primary antenna elements into the transmit or receive modes. The secondary elements are preferably arranged into a number of vertical subarrays to provide relative gain over the sidelobe levels of the primary elements. A high secondary-to-primary gain differential minimizes thermal noise feedthrough in the interference suppression process. The secondary antenna elements are also preferably located at random and fully spaced on the surface of array 10 so as to prevent the formation of grating lobes and to be effective against closely spaced interference sources. Extra cross-polarized secondary antenna elements are also preferably utilized to counter cross-polarized interference sources.

Reflection of the transmitted radar pulse from a target results in swath echo signals being received by each of the antenna elements of array 10. The various swath echo signals are then fed through the multiple antenna manifolds 18 to respective multiple receivers 19 along a plurality of primary and secondary channels. Typically, respective receivers translate these swath echo signals from their radio frequency carrier to baseband, which can be easily processed. The signals are then converted to digital form as inphase ("I") and quadrature ("Q") components to properly preserve phase information.

Generally, any gain and phase imbalance in the production of the I and Q components produces undesirable signal images. Additionally, gain and phase mismatches between respective receivers will limit the effectiveness of the subsequent interference suppression techniques. To ameliorate these effects, this data is fed to matching circuitry 20 which performs channel equalization and I/Q balancing. Such channel equalization may preferably be accomplished by matching the frequency domain outputs of the respective receivers utilizing a known technique called the fast Fourier transform ("FFT"). Alternatively, a digital finite impulses response ("FIR") filter can be utilized to implement the required channel equalization. The coefficients of such a FIR filter may be obtained through a least square minimization process during periodic receiver calibrations.

The invented wideband adaptive canceler uses a feedforward data arrangement to facilitate fast and finite convergence in the generation of the adaptive weight vector. Multiple adaptive weight vectors will be generated within each interpulse period, each applied to corresponding subintervals of the received echo. Data buffer 21 is utilized to temporarily store data in each of the channels so that the adaptive weight vector can be applied to the same data used to generate the weights. Main channel selector 24 selects a main channel from the primary channels for each subinterval of data used to generate an adaptive weight vector. The presence of clutter in the data used to generate the adaptive weight vector may produce pattern nulls in directions other than those of the interference sources. Thus, this data is preferably applied to clutter canceler 25 prior to being passed to adaptive weight generator 26.

Adaptive weight generator 26 preferably implements a least squares algorithm to minimize the effect of interference during the particular subinterval of the swath echo signals. The weight vector is then applied to the stored data and subtracted from the selected primary channel at adaptive weight applicator 27. Data in the selected primary channel is then processed as desired at processor 28. In a SAR implementation, for example, processor 28 may produce ultrahigh resolution imagery via the polar format algorithm. The polar format algorithm is an efficient processing algorithm which compensates for movement of map elements through range resolution cells during the long coherent integration period.

Figure 2A:
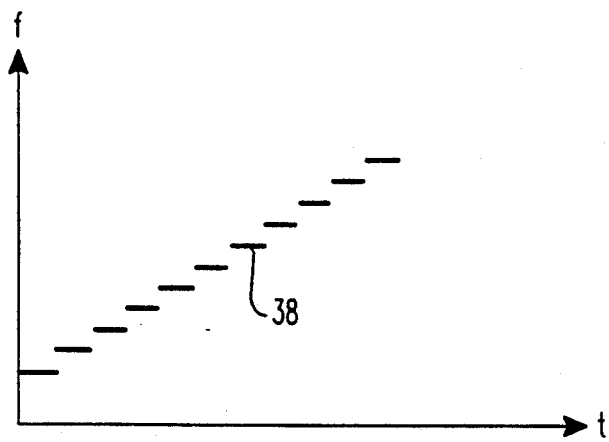
FIG. 2A is a graphical representation of the time versus frequency characteristic of a step chirp waveform signal.

The manner in which the present invention offers improved interference suppression capability can be most readily understood by examining the time versus frequency characteristics of the linear frequency modulated signals often appearing in a wideband radar apparatus. This is illustrated in FIG. 2, wherein the abscissa axis represents variations in time and the ordinate axis represents variations in frequency. Wide bandwidth radars typically transmit a linear frequency modulated signal, such as "chirp" signal 35. Generally, signal 35 is defined in terms of the product of its bandwidth 36 and pulse duration 37. A typical time-bandwidth product for such a signal may be one hundred (100) or greater. Utilizing this technique, a bandwidth commensurate with the desired resolution is transmitted while allowing efficient use of the average power capability of the radar. Generation of a very short pulse, for example, to effect wide bandwidth transmission would not deliver adequate energy per pulse to produce a sufficient echo signal-to noise ratio. Additionally, the chirp waveform is preferred over other long pulse methods because it greatly reduces the sampling rate requirement of the analog-to-digital converter in the respective receiver. An important exception to the widespread use of a linear frequency modulated waveform is the "step chirp" waveform. This type of signal, which is illustrated in FIG. 2A, simulates the ordinary chirp waveform by sequentially transmitting a number of discrete pulses, such as pulse 38, having different fundamental frequencies.

Reflected electromagnetic energy from signal 35 produces in each of the primary and secondary channels a swath echo signal, such as swath echo signal 40. As can be seen, swath echo signal 40 generally has a frequency characteristic increasing linearly with time, but also has a range interval 41 due to range differences between various targets within the overall swath. Each of the receivers (collectively referred to as 19) will typically contain a number of mixers to translate the swath echoes signal from the received radio frequency to a baseband signal which is more amenable to processing. This may be accomplished by a deramp mixing of the swath echo signal with a frequency shifted and delayed replica of the transmitted signal. For example, signal 40 may be mixed with a replica signal 42 produced by a sweeping local oscillator to yield intermediate frequency (IF) frequency signal 43. As can be seen, the linear FM component present in signal 40 has been cancelled in IF signal 43. IF signal 43 thus has an IF bandwidth 44 centered about intermediate frequency 45. If range interval 41 is less than pulse duration 37, bandwidth 44 will be less than bandwidth 37 by that factor. Signal 43 may then be mixed one or more times to eventually produce the I and Q component signals at baseband. It should be noted that channel equalization requirements at matching circuitry 20 can be minimized by increasing the transmitted pulse width, which decreases the IF bandwidth for a given echo signal range swath.

Figure 3:
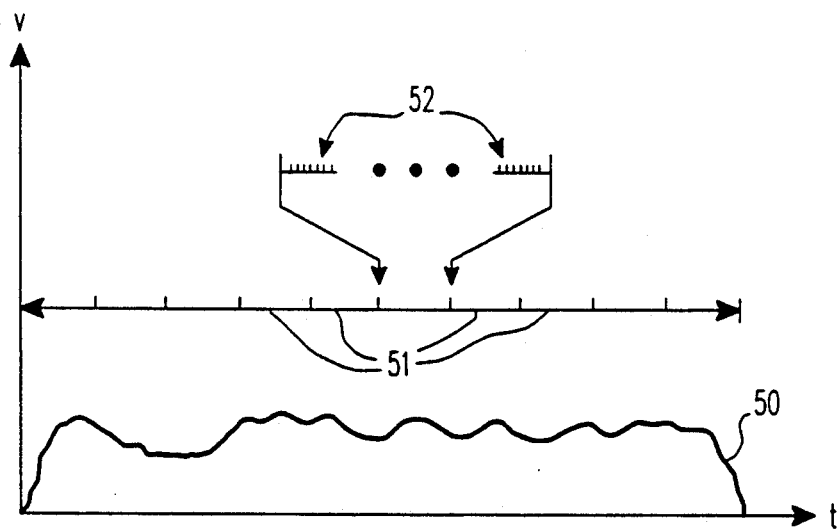
FIG. 3 is a graphical representation of the time versus voltage characteristic of a basebanded swath echo signal.

The intermediate frequency bandwidth reduction described may be exploited by the present invention to give improved interference suppression characteristics. This is due to the fact that adaptive interference suppression performance is a strong function of interference bandwidth because weighting is generally effected by digital phase compensation rather than true time delays. Referring to FIG. 3, a baseband signal 50 such as may result from signal 43 is illustrated. Signal 50 is divided into a number of subintervals 51, each of which receives an adaptive interference suppressing adjustment. As shown in the enlargement in FIG. 3, the respective receiver samples each subinterval 51 a multiplicity of times to convert the basebanded signal to digital form 52.

The interference bandwidth that each interference suppressing adjustment is required to handle is defined by the IF bandwidth over the respective subinterval 51 instead of the total RF bandwidth of the transmitted signal. This solution offers minimum hardware impact to the overall radar system. The amount of computations required, for example, to effect K adaptive interference suppressing adjustments within each interpulse period is approximately K times that which is needed to generate a single such adjustment. This represents significant savings over the classical approach where the number of adaptive channels (time delay taps) is increased K times, and the amount of computations is increased by more than the square of K to effect wideband interference suppression. For a reasonable K value of 10, a computation savings of more than 10:1 can be realized with the invention. Additionally, the invention does not require interpolation computations which are frequently needed in the classical approach to produce tap delayed data for the added adaptive channels. In the case where the transmitted signal is a step chirp waveform, the invention is simplified to a single adaptive update per step chirp pulse.

Figure 4:
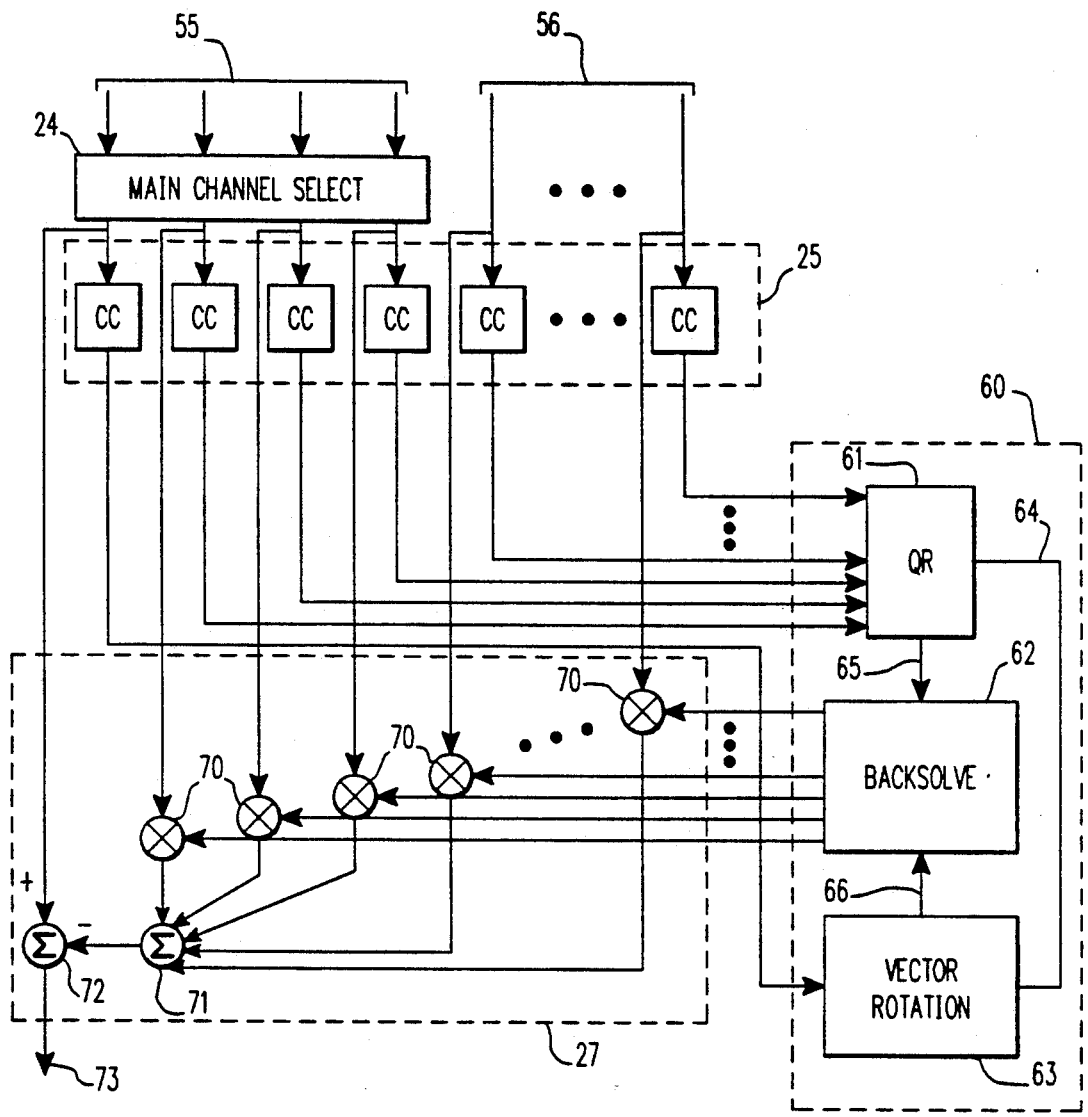
FIG. 4 is a diagrammatic representation of presently preferred interference cancellation means constructed in accordance with the invention.

Each window of digital data stored in buffer 21 (FIG. 1) corresponds to the sampled data of one of subintervals 51 in digital form. Referring to FIG. 4, a device of the invention is illustrated which operates to perform the interference suppressing adjustment for each data subinterval period. In this arrangement, adaptive main beam canceler and adaptive sidelobe canceler functions are combined in single adaptive processing arrangement. In other words, data input on primary channels referenced collectively at 55 and secondary channels collectively referenced at 56 are together utilized to generate an adaptive weight vector as will be described. In presently preferred embodiments, four primary channels are provided: a sum channel, a delta azimuth channel, a delta elevation channel, and a delta delta channel. In most applications, the sum channel data are range and azimuth compressed after adaptive interference suppression to produce high resolution imagery. When an interference is situated near the center of the main beam, however, it is advantageous to switch to one of the delta channels as the main data channel. Thus, main channel selector 24 chooses a main data channel prior to adaptive processing. Preferably, selector 24 bases the main channel decision on a comparison of the magnitude of interference power present in the respective primary channels. In this combined data arrangement, all receiver channels except the main channel chosen by selector 24 are considered auxiliary channels, and a weighted sum of all auxiliary channels is subtracted from the main channel to effect both mainbeam and sidelobe interference suppression.

The adaptive weight vector for each subinterval of data is obtained through an optimization procedure which maximizes the output signal-to-noise ratio for the particular subinterval. Specifically, the adaptive weight vector is given by the following:

$$\underline{w}_k = C_k^{-1}\underline{r}_k \quad k=1, 2, \ldots, K$$

where: (1) $C_k = X_k^H X_k$ is the N by N dimension auxiliary channel data covariance matrix for the kth subinterval; (2) $\underline{r}_k = X_k^H \underline{x}_{ok}$ is the N dimension cross-correlation vector between the main and auxiliary channels; (3) $X_k$ is the M by N auxiliary channel data matrix; and (4) $\underline{x}_{ok}$ is the M dimension main channel data vector. The dimension M is the number of time samples in the respective subinterval and N is the total number of adaptive channels The $-1$ superscript denotes matrix inversion, and superscript H denotes conjugate transpose (Hermitian) operation.

The above equation when solved directly in the sampled matrix inversion algorithm has a number of shortcomings. First, the explicit formation of the data covariance matrix doubles the word length requirement of the processor. Second, the direct inversion of the covarience matrix will run into numerical stability problems whenever the covarience matrix is ill conditioned. Finally, direct solution for the adaptive weight vector requires a global data transfer which is not compatible with implementation in certain parallel array processors.

According to the present invention, these shortcomings are overcome according to an improved least squares algorithm. Specifically, an orthogonal triangularization algorithm is utilized which is compatible with implementation in a systolic array, such as systolic array 60 (referred to in FIG. 1 as adaptive weight generator 26). A systolic array is typically realized utilizing very large scale integration (VLSI) techniques and consists of individual processing cells arranged in a regular structure. Each cell in the array is connected only to its nearest neighbors and includes a local memory. Regular streams of data are clocked through the array and processed in a rhythmic fashion. Since this discrete "pumping" action is similar to that seen in the human heart, the name "systolic" has been adopted. The presently preferred algorithm implemented by array 60 is a QR decomposition operation which may be performed by one of the following systolic processing techniques: modified Givens rotation, Householder reflection, and modified Gram-Schmidt orthogonalization procedure. These techniques are reviewed in Simon Haykin, *Adaptive Filter Theory* (1986), published by Prentice-Hall, Inc. The following equation denotes such a QR decomposition of the auxiliary data matrix:

$$X_k = Q_k \left[ \frac{R_k}{O} \right] k = 1, 2, \ldots, K$$

where: (1) $Q_k$ is a unitary matrix of dimension M by M which has the characteristic $Q^H Q = I$ (I is an identity matrix); (2) $R_k$ is an upper triangular matrix of dimension N by N; and (3) O is a (M N) by N dimension null matrix. With orthogonal decomposition of the auxiliary data matrix the optimal solution equation becomes:

$$R_k \underline{w}_k = Q_k^H \underline{x}_{ok}$$

This equation is solved by the systolic array as will now be explained to produce the weight vector $\underline{w}_k$.

Functionally, systolic array 60 can be thought of as including a number of distinct operative blocks 61, 62 and 63. All data utilized to generate the vector $\underline{w}_k$ is first passed through identical clutter cancellation ("CC") filters (collectively referred to as 25). The auxiliary channel data is then fed to block 61 for QR decomposition. The Q matrix produced by block 61 is passed to block 63 along line 64. The R matrix also produced by block 61 is passed to block 62 along line 65. The main channel data vector $\underline{x}_{ok}$ is passed after clutter filtering to block 63, where it is rotated to obtain $\underline{y}_{ok}$ equal to $Q_k^H \underline{x}_{ok}$. This rotated vector $\underline{y}_{ok}$ is then fed to block 62 along line 66. A further reduction in computation may be effected by augmenting the data matrix $X_k$ with main channel data vector $\underline{x}_{ok}$ to produce the rotation $Q_k^H \underline{x}_{ok}$ during the QR decomposition. This technique of implicitly generating a Q matrix is discussed in the work: Golub and Van Loan, *Matrix Computations* (1983), published by Johns Hopkins University Press.

Block 62 solves by back substitution the triangular equation $R_k \underline{w}_k = \underline{y}_{ok}$ to obtain the adaptive weight vector $\underline{w}_k$. The respective adaptive weight vector $\underline{w}_k$ is then applied to auxiliary channel data which has not been clutter filtered at multiplier junctions 70. Next, the weighted auxiliary channel data is summed together at summing junction 71. The cumulative output of summing junction 71 is then substracted from main channel data which has not been clutter filtered at summing junction 72. As a result, data is produced at output 73 for further processing in which overall interference has been significantly reduced.

Figure 5:
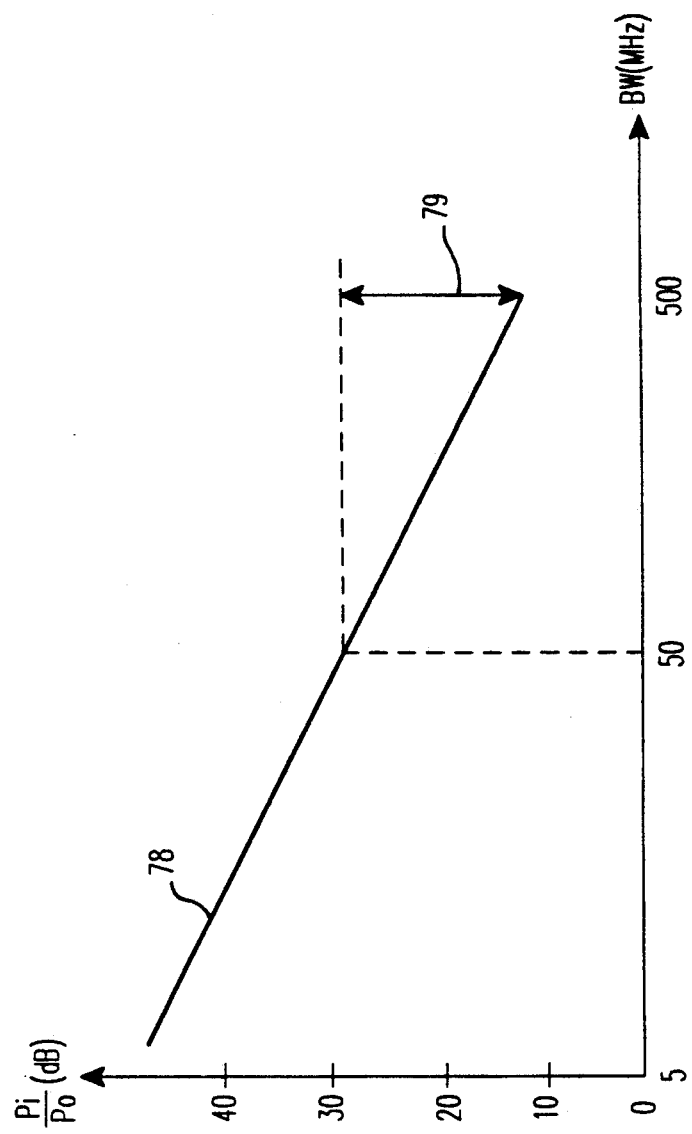
FIG. 5 is a graphical representation illustrating an estimated improvement in interference cancellation which may be achieved by the teachings of the present invention.

An estimation of the improvement in wideband adaptive interference suppression obtainable with the invention may be performed by postulating a single wideband interference as equivalent angular distributed interferences. FIG. 5 shows a plot of the interference cancellation ratio ($P_i/P_0$) as a function of bandwidth for a three foot array at X band frequency. Specifically, a hypothetical interference at 30° off antenna broadside is represented by linear plot 78. It can be seen that the expected interference cancellation ratio is approximately 13 dB at 500 MHz bandwidth (which corresponds to a one foot resolution). The cancellation ratio is improved to approximately 30 dB when the bandwidth is reduced to 50 MHz, which corresponds to ten weight updates within a single pulse according to the invented bandwidth reduction approach. This 17 dB improvement in interference suppression is illustrated at 79. Further improvements can be obtained by either increasing the number of updates or by increasing the number of tap delayed adaptive loops for each weight vector.

The invention thus provides a device and method usable with a wideband radar apparatus to give improved interference suppression capability without expansion of the number of adaptive channels or exponential increases in total computations. In addition to SAR, the invention is also applicable to other wideband radar modes such as inverse synthetic aperture radar ("ISAR") and noncooperative target recognition ("NCTR") which use chirp and step chirp waveforms as the transmitted signal. Additionally, the approach is equally applicable to passive electronically phased array antennas which are frequently used in certain radar and communication applications.

While presently preferred embodiments of the invention and presently preferred methods of practicing the same have been shown and described, it is to be distinctly understood the invention is not limited thereto but may be otherwise variously embodied and practiced within the scope of the following claims.

We claim:

1. A wideband radar apparatus having improved interference suppression capability, said apparatus comprising:

an array of antenna elements combined to form a plurality of primary and secondary channels;

transmitter means for transmitting a long pulse radio frequency signal having a wide bandwidth;

receiver means for receiving a swath echo signal from each of said plurality of primary and auxiliary channels and respectively producing intermediate frequency signals each having a total bandwidth less than said wide bandwidth of said long pulse radio frequency signal;

interference suppression means for effecting a multiplicity of adaptive interference suppressing adjustments to a swath echo signal in a selected one of said primary channels, said interference suppression means including a systolic array; and processing means for processing swath echo signals received form said interference cancellation means.

2. The wideband radar apparatus of claim 1 wherein said receiver means comprises means for producing intermediate frequency signals having a total bandwidth less than said wide bandwidth of said long pulse radio frequency signal by a factor generally equal to a pulse duration of said long pulse radio frequency signal divided by a range interval of a corresponding swath echo signal.

3. The wideband radar apparatus of claim 1 wherein said transmitter comprises means for transmitting a linear frequency modulated waveform signal.

4. The wideband radar apparatus of claim 1 wherein said transmitter comprises means for transmitting a step chirp waveform signal comprising a number of discrete pulses having different fundamental frequencies.

5. The wideband radar apparatus of claim 4 wherein said interference suppression means comprises means for effecting a multiplicity of adaptive interference suppressing adjustments corresponding to said number of discrete pulses of said long pulse radio frequency signal.

6. An adaptive interference suppression device usable with an antenna array apparatus having a plurality of primary and secondary channels, said device comprising:
   data buffer means for collecting data windows over a multiplicity of subintervals of an interval a signal is received by said primary and secondary channels;
   means for selecting a main channel from said primary channels corresponding to a particular subinterval, wherein channels of said plurality of primary channels other than said main channel as well as all of said plurality of said secondary channels are auxiliary channels;
   adaptive weight generation means for receiving respective data windows corresponding to said respective subinterval from said main channel and said auxiliary channels and responsively producing a weight vector to minimize interference during said particular subinterval;
   means for respectively applying weights of said weight vector to auxiliary channel data windows corresponding to said particular subinterval;
   summing means for summing weighted auxiliary channel data windows corresponding to said particular subinterval; and
   means for subtracting an output of said summing means from a main channel data window corresponding to said particular subinterval.

7. The device according to claim 6 wherein said adaptive weight generation means comprises means for producing said weight vector according to a least squares algorithm.

8. The device according to claim 7 wherein said adaptive weight generation means comprises means for producing said weight vector according to an orthogonal triangularization algorithm.

9. The device according to claim 7 wherein said adaptive weight generation means comprises:
   first means receiving respective data windows from said auxiliary channels corresponding to said particular subinterval for performing thereon a QR decomposition operation;
   second means receiving said data window from said main channel as a main channel vector and further receiving orthogonal matrix from said first means for producing an optimum response vector; and,
   third means receiving an upper triangular matrix from said first means and further receiving said optimum response vector from said second means for producing said weight vector.

10. The device according to claim 7 wherein said adaptive weight generation means comprises a systolic array.

11. The device according to claim 6 further comprising clutter cancellation means for suppressing clutter in data used to generate said weight vector.

12. A method of suppressing interference present in an electromagnetic swath echo received over an interval of time by an antenna array combined to form a plurality of primary and secondary channels, said method comprising the steps of:
   (a) sampling swath echo signals in each of said plurality of primary and secondary channels over a subinterval of time less than said interval of time;
   (b) assembling respective windows of data sampled in each of said plurality of primary and secondary channels over said subinterval of time;
   (c) selecting a main channel from said primary channels;
   (d) producing a weight vector to minimize interference during said subinterval;
   (e) applying said weight vector to respective windows of data corresponding to channels other than said main channel;
   (f) summing together windows of data to which said weight vector has been applied; and,
   (g) subtracting a sum of windows of data to which said weight vector has been applied from a window of data in said main channel.

13. The method of claim 12 wherein said weight vector is produced in step (d) according to a least squares algorithm.

14. The method of claim 13 wherein said weight vector is produced in step (d) according to an orthogonal triangularization algorithm.

15. The method of claim 14 wherein step (d) comprises:
   (h) assembling a M by N dimension matrix X of respective windows of data corresponding to channels other than said main channel, where M is a number of total samples in said subinterval and N is a number of said channels other than said main channel;
   (i) performing a QR decomposition on matrix X to result in the following relationship:

$$X = Q\begin{bmatrix} R \\ O \end{bmatrix} k = 1, 2, \ldots, K$$

where:
   Q is a unitary matrix of dimension M by M having the characteristic $Q^H Q = I$, where H represent conjugate transpose and I is an identity matrix,
   R is an upper triangular matrix of dimension N-by-N, and
   O is a (M-N) by N dimension null matrix;
   (j) assembling a M-by-one vector $\underline{x}_o$ of a window of data corresponding to said main channel;
   (k) rotating vector $\underline{x}_o$ to obtain a M-by-one optimum response vector $\underline{y}_o$ satisfying the relationship $\underline{y}_o = Q^H \underline{x}_o$;
   (l) solve by back substitution the optimal solution equation R $\underline{w} = \underline{y}_o$, where $\underline{w}$ is said weight vector having dimension N by one.

* * * * *